J. H. ROSEAN.
ENDLESS CUTTING APPARATUS FOR MOWERS.
APPLICATION FILED MAY 7, 1910.
1,000,949.
Patented Aug. 15, 1911.
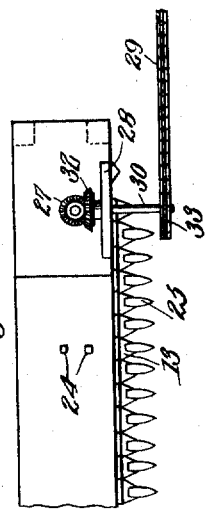
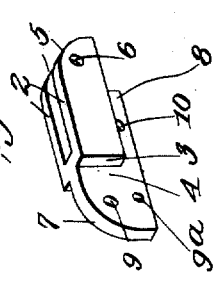
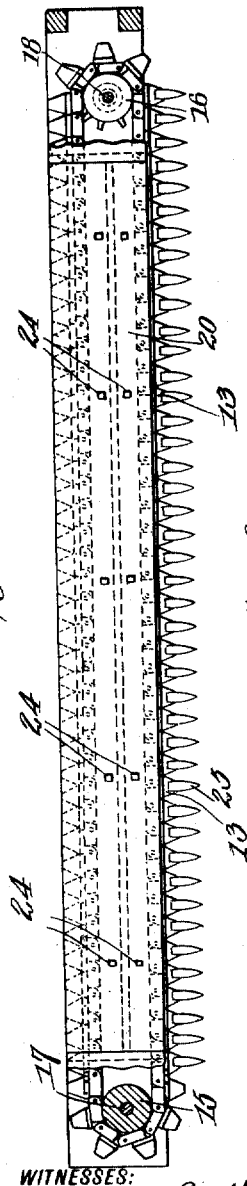
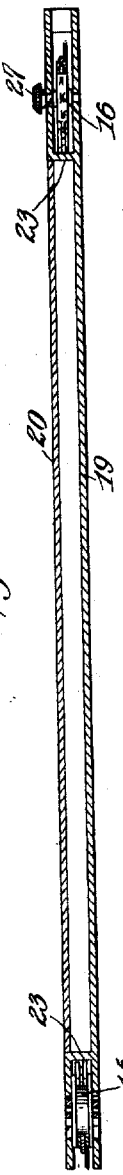
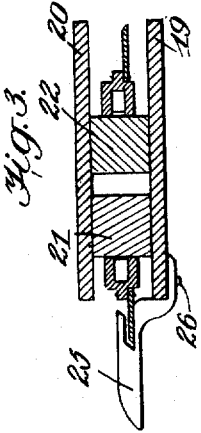
WITNESSES:
Samuel E. Wade
O. E. Trainor
INVENTOR
JOHN H. ROSEAN
BY Munn & Co.
ATTORNEYS

UNITED STATES PATENT OFFICE.

JOHN H. ROSEAN, OF COLUMBUS, MONTANA, ASSIGNOR OF ONE-HALF TO H. L. RAIFF AND E. B. THAYER, OF COLUMBUS, MONTANA, A COPARTNERSHIP.

ENDLESS CUTTING APPARATUS FOR MOWERS.

1,000,949.     Specification of Letters Patent.     Patented Aug. 15, 1911.

Application filed May 7, 1910. Serial No. 560,003.

*To all whom it may concern:*

Be it known that I, JOHN H. ROSEAN, a citizen of the United States, and a resident of Columbus, in the county of Yellowstone and State of Montana, have made certain new and useful Improvements in Endless Cutting Apparatus for Mowers, of which the following is a specification.

My invention is an improvement in endless cutting apparatus for mowers, and consists in certain novel constructions, and combinations of parts, hereinafter described and claimed.

The object of the invention is to provide a cutter bar having a sickle bar moving continuously in one direction, thus dispensing with the wear, and jar, and heavy draft of the usual reciprocating bar, and lessening the cost of operation and maintenance of the mowing machine Referring to the drawings forming a part hereof, Figure 1 is a plan view of the improvement, Fig. 2 is a longitudinal vertical section, Fig. 3 is an enlarged transverse section, Fig. 4 is a plan view of a portion of the cutting mechanism, Fig. 5 is a rear edge view of the same, Fig. 6 is a detail perspective view of a link of the carrier, Fig. 7 is a transverse section of the same, and Fig. 8 is a plan view of one end of the cutter bar showing the driving connection for the said bar.

In the present embodiment of the invention, the cutting mechanism proper consists of a carrier comprising an endless chain 1, composed of a plurality of links, 2, shown more particularly in Figs. 6 and 7. Each link comprises a substantially rectangular box having side walls 2, one end wall 3, and a longitudinally extending vertical lug 4 at the center of the closed end. The ends of the side walls remote from the end wall 3 are rounded at their upper corners as at 5, and each is provided with a transverse opening 6, the opening of one wall registering with the opening of the other wall. The lug is also rounded at its upper corner as at 7, and is of greater width than the depth of the box as shown, and is extended as at 8 beneath the box to approximately the longitudinal center thereof. The lug is provided with a plurality of transverse openings 9—9ª, arranged in vertical alinement, and the extension 8 is also provided with a transverse opening 10 at approximately its center. Each box is also provided with a longitudinal slot 11 in its bottom and extending from the open end for receiving the lug of the adjacent link.

The links practically consist each of a pair of spaced parallel walls connected at one end by a third wall of greater width and extending in the opposite direction, rounded at their ends and perforated as specified, and the excess in width of the central wall over the side walls offers a ledge or rib to which the sickle blade is attached. The links are arranged with the lug of each link secured between the walls 2 of the preceding link, and rivets 12 are passed through the registering openings 6 and 9 to pivotally connect the links.

A sickle blade 13 of substantially triangular form is secured to the lower edge of each lug and its extension 8, by means of rivets 14 passed through spaced openings in the base of the blade, and through the openings 9ª and 10. The sides of the blades are sharpened in the usual manner, and it will be evident that when the links of the chain are in alinement, the blades will be arranged with their bases in alinement, and with the ends of the bases abutting, so that a practically continuous cutter is provided.

The carrier is supported for movement on a pair of spaced sprocket wheels 15 and 16, which are secured to shafts 17 and 18 respectively, and the shafts are journaled transversely of a pair of spaced parallel plates 19 and 20. The plates 19 and 20 are held in spaced relation by means of bars 21 and 22, which are arranged longitudinally between the plates, in sidewise abutting relation. The bars 21 and 22 are of less aggregate width than the plates, and are spaced apart from the side edges of the said plates, but unequally being nearer the front edge than the rear. The arrangement is such that at the rear edge, the distance from the outer face of the rearmost block to the side edge of the plate is equal to the distance from the point of the blade to the rear face of the chain, so that the entire cutting surface of each blade is shielded by the overhanging edges of the plates. At the front side edges of the plates, the space between the outer face of the bar and the free edge of the plates is merely sufficient to receive the chain, so that the full extent of the cutting edges of the blades is projected beyond the plates. The bars 21 and 22 are of lesser length than the plates, so that sufficient space is left for the sprocket wheels, and the plates are connected by transverse partitions 23 at the ends of the bars. The plates and bars are connected at suitable intervals by bolts 24, and a plurality of guard teeth 25 of usual form are secured to the front edge of the lowermost plate 19 by means of rivets or bolts 26. The shaft 18 of the sprocket wheel 16 is extended upwardly above the plate 20, and a bevel gear wheel 27 is secured thereto.

A bracket 28 is secured to the end of the upper plates adjacent to the bevel gear, and a shaft 30 is journaled in a bearing in the bracket. The inner end of the shaft is provided with a bevel gear 32, which meshes with the gear 27, and the outer end with a sprocket wheel 33, which may be connected by a chain 29 with a moving part of the machine, whereby to rotate the shaft 30 and drive the cutter.

In operation, the shaft 30 being rotated, the sprocket wheel 16 is also rotated, and the carrier chain is moved longitudinally. The front and rear runs of the chain move against the outer faces of the bars 21 and 22, which form a support, and hold the front run against the grain. The cutters move continuously in one direction, thus dispensing with the continued jar and strain of a reciprocating cutter, and considerably lessening the draft of the machine.

The improved cutter bar may be attached to any form of machine mower, and will run with great smoothness, and little jar. By removing the upper plate 20, the cutting mechanism may be removed for any purpose, and the bar as a whole may be made of any suitable length. It is easily operated, and as the movement of the parts is continuous, and steady in one direction, the mechanism is long lived and cheaply operated.

I claim—

A cutter bar comprising a supporting frame composed of spaced parallel superposed plates, a pair of bars arranged between the plates each extending longitudinally thereof, one being near each side edge, said bars being spaced apart from the respective side edge, said plates extending beyond the bars at each end, a sprocket wheel between the plates at each end of the bars, an endless chain supported on the wheels, said chain comprising a plurality of links, each of said links having at one end a lug and at the other a pair of spaced lugs for receiving the lug of the adjacent link, rivets traversing the lugs for pivotally securing the adjacent links together, each of the said links having at one side edge a longitudinal flange, a cutting blade secured to the flange of each link, the said bars being spaced from one side edge of the plate a sufficient distance to conceal the blade and at the other side edge a lesser distance to project the blades beyond the plates.

JOHN H. ROSEAN.

Witnesses:
THOMAS P. MUHEHILL,
BENJAMIN E. OGLEBY.

---

Copies of this patent may be obtained for five cents each, by addressing the " Commissioner of Patents, Washington, D. C."